Sept. 29, 1936.   J. HALTENBERGER   2,055,975
AUTOMOTIVE VEHICLE
Filed Dec. 12, 1932   3 Sheets-Sheet 1
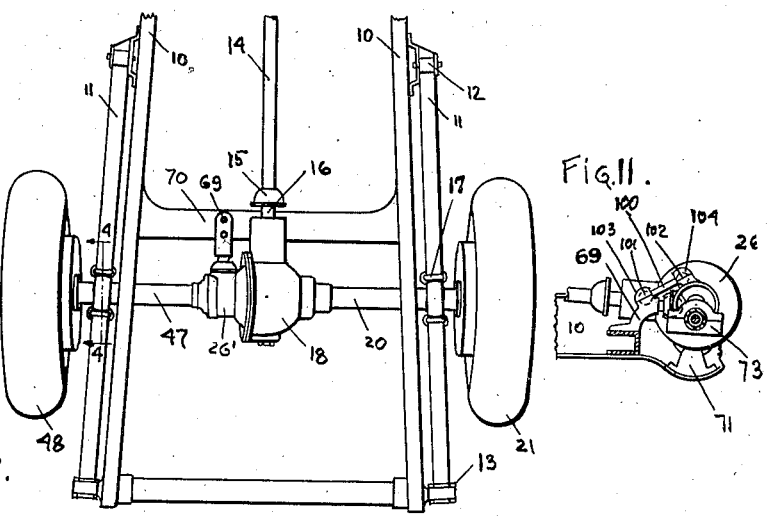
INVENTOR
JULES HALTENBERGER Sept. 29, 1936.  J. HALTENBERGER  2,055,975
AUTOMOTIVE VEHICLE
Filed Dec. 12, 1932  3 Sheets-Sheet 2
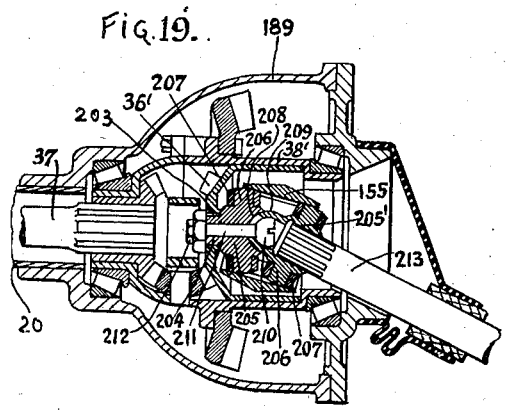
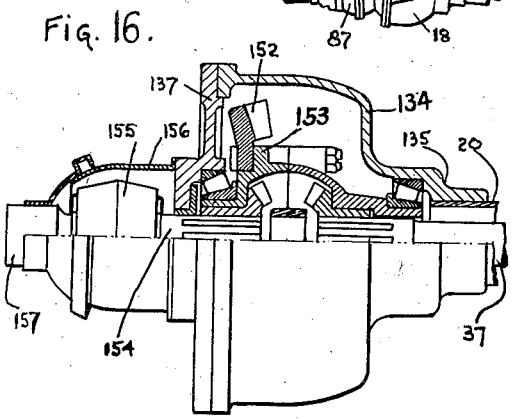
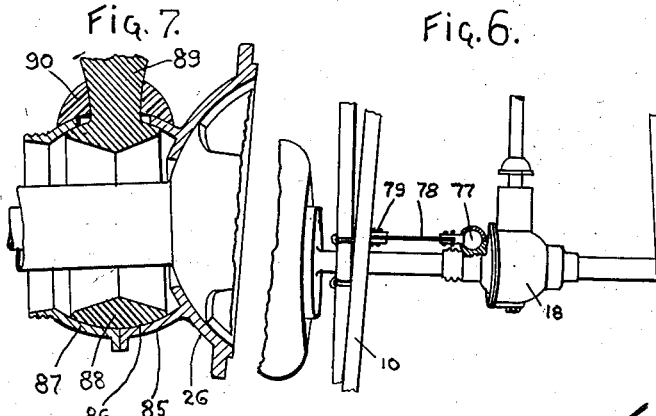
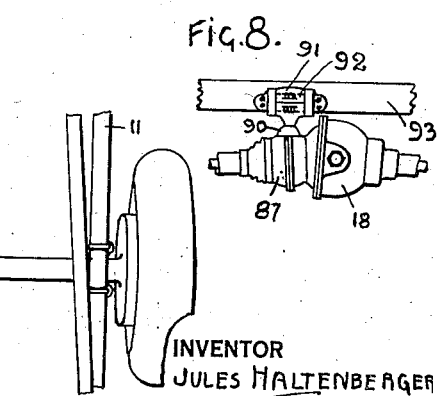
INVENTOR
JULES HALTENBERGER Sept. 29, 1936.                J. HALTENBERGER                2,055,975
                                AUTOMOTIVE VEHICLE
                              Filed Dec. 12, 1932          3 Sheets-Sheet 3
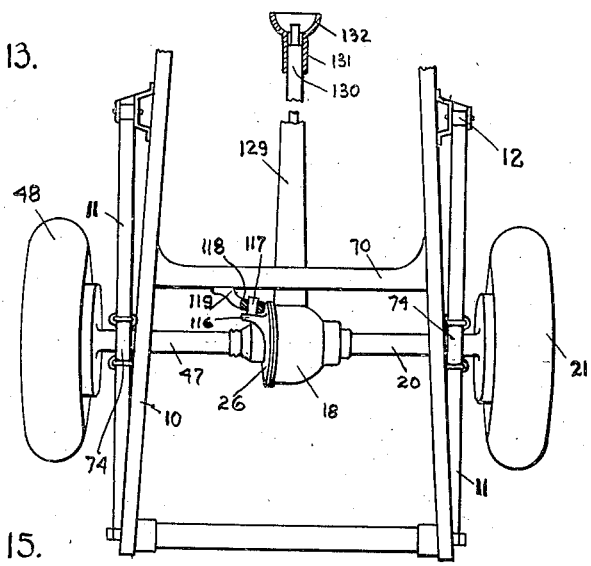
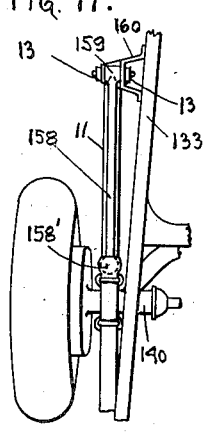
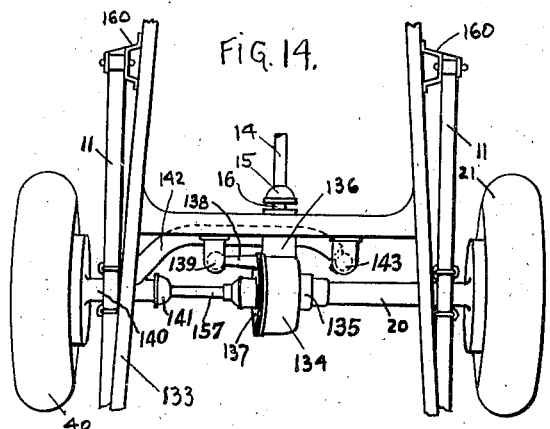
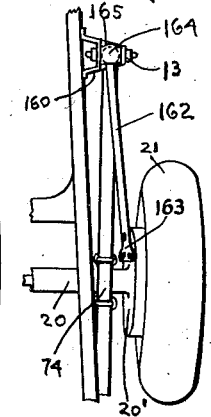
INVENTOR
JULES HALTENBERGER Patented Sept. 29, 1936

2,055,975

UNITED STATES PATENT OFFICE 2,055,975

AUTOMOTIVE VEHICLE

Jules Haltenberger, Indianapolis, Ind.

Application December 12, 1932, Serial No. 646,785

27 Claims. (Cl. 180—73)

My invention relates to improvements in self-propelled vehicle construction and more especially is concerned with independent or practically independent wheel suspension; and is also concerned with simplified automobile constructions, preferably driven by independently suspended wheels.

It is the object of my invention to replace the solid axle of an automobile of present day production with an independently sprung axle mechanism while adding to the frame a stationary or slightly movable "fulcrum point", otherwise leaving the general chassis construction, including the spring design and general location thereof undisturbed, to permit such production change with limited tool expense, time and experiment.

A further object of my invention is to apply independent wheel suspension to an automobile of the present day production without changing the present method of drive, whether it be the Hotchkiss drive or torque tube drive or torque tube and spring drive or spring torque and radius rod drive.

A further object of my invention is a new radius rod torque and drive.

A further object of my invention is the use of an axle construction which is hinged on the opposite side of the automobile center-line from its associated wheel and between the two associated wheels and is referred to as "long-hinged". Said wheels have less tread variation, the axle has more road clearance and a reduced extreme angle while the springs are flexed than one having its radius center at the longitudinal center-line of the automobile and vertically in the meeting-point of the axle half center-lines. This construction is referred to as "center-hinged", and described in U. S. Patent No. 1,937,653.

A further object of my invention is an independent wheel suspension aiming to reduce the number of universal joints needed.

A further object of my invention is to reduce the toeing in or toeing out of a wheel mounted on a hinged axle at spring flexure when connected to a laminated spring or a radius rod mounted lengthwise on an automobile to drive it.

A further object of my invention is to eliminate the twisting of a semi-elliptical spring when used with a hinged axle, whether long-hinged, center hinged or with one with still greater tread variation, namely: "short-hinged" type.

A further object of my invention is to reduce the axle gearing tooth pressure variations caused by the change of wheel-base length.

Further objects of my invention will appear as the description proceeds.

The accompanying drawings illustrate my invention: Figure 1 is a fragmental plan of the rear end of a Hotchkiss drive automobile chassis; Figure 2 is a side elevation of the rear end of an automobile chassis illustrated in Figure 1; Figure 3 is a horizontal, longitudinal section on line 3—3 of Figure 2, illustrated in larger scale; Figure 4 is a vertical section on line 4—4 of Figure 1, illustrated in larger scale; Figure 5 is a view of Figure 4 with the cap removed and some parts broken away; Figure 6 is a fragmental plan of a modified axle fulcrum for a chassis similar to Figure 1; Figure 7 is a fragmental rear elevation with parts broken away, of a modified axle center housing fulcrum, shown in Figure 1; Figure 8 is similar to Figure 7, illustrating a link fulcrum; Figure 9 is a modified fulcrum connection of Figure 8; Figure 10 is a modified axle center housing and fulcrum, shown in Figure 1; Figure 11 is a side elevation of Figure 10 with parts broken away; Figure 12 is a fragmental plan of the rear end of a torque tube drive automobile chassis; Figure 13 is a fragmental plan of the rear end of a torque tube and spring drive automobile chassis; Figure 14 is a fragmental plan of the rear end of a Hotchkiss drive automobile chassis; Figure 15 is a rear elevation of Figure 14; Figure 16 illustrates the axle gearing and differential of the axle of Figures 14 and 15 in larger scale with parts broken away; Figure 17 is a fragmental plan view of a spring torque and radius rod drive; Figure 18 is a fragmental plan view of a radius rod torque and drive; Figure 19 is an axle gearing and differential, a modification of the invention.

In the construction illustrated in Figures 1, 2 and 3 the frame side members 10 of the automobile extend rearwardly beyond the rear axle and are supported by semi-elliptical springs 11 by direct fulcruming at their front ends like at 12 and through spring shackles 13 at their rear ends. The rear axle is driven by a propeller shaft 14 through a universal joint in the housing 15 carried by the axle pinion shaft 16, with the customary sliding joint between the pinion shaft 16 and the front end power plant (not shown). The rear axle is clamped to the approximate center of springs 11 by the unusual U bolts 17. Until now this describes the well known Hotchkiss drive.

Figures 1, 2 and 3 illustrate that axle housing 18 is integral with hub 19 which is positively connected in a suitable manner to axle tube 20, carrying the driving wheel 21. Integral with axle housing 18 is the pinion shaft housing 22 in which pinion shaft 16 is mounted in the usual manner. Axle housing 18 is provided with a large opening 23 at the opposite side of axle tube 20 in which opening the bearing plate 24 is mounted. Bearing plate 24 is provided with a smooth spherical surface 25 and secured to the bearing plate is a cover plate 26 which is provided with a hub 26' and with a smooth concave surface 27 and a hemispherical socket 28 formed into hub 26', continuation of which socket is in cap 29 mounted on hub 26'. Between bearing plate 24 and the hub 19 is mounted the differential case 30 in suitable bearings. Connected to it in the usual manner is the axle gear 31 which meshes with axle pinion 32 on pinion shaft 16. Differential housing 30 transfers the turning power it receives from the gears to differential pin 33 on which differential pinion 34 distributes the power to differential gears 35 and 36, gear 35 driving through axle shaft 37 its associated driving wheel 21. Differential gear 36 is provided with a bearing sleeve 38 on which it runs. In bearing sleeve 38 are extensions 39 integral with differential gear 36, formed to be the driving part of a crosshead universal joint. The housings 18 and 22 and plates 24 and 26 carry and surround the rear axle gearing and differential and through axle tube 20 carry the driving wheel 21. These associated parts, namely from 15 to 39 inclusive, will be referred to in this application as the "primary unit" of the axle.

The bearing plate 24 and cover plate 26 provide a space between their surfaces 25 and 27 respectively for the reception of spherical flange 45, which is integral with hub 46, which is positively connected in a suitable manner to axle tube 47, carrying the associated driving wheel 48. Axle tube 47 surrounds and pilots axle shaft 49 which at its inner end is formed into hub 50 to be the driven part of a crosshead universal joint, carrying universal joint pin 51 and universal blocks 52. As shown in Figure 3 universal blocks 52 are not mounted directly on universal pin 51 but with the interposition of needle bearings 53 which are also held in place by caps 54. With needle bearings for a given power the universal joint can be of reduced diameter.

The spherical flange 45, axle tubing 47, associated driving wheel 48 and axle shaft 49 and all parts of the driven part of the universal joint, which are not bolted to the driving part, will be referred to as the "secondary unit" of the axle.

The primary and secondary units are hinged together by the spherical flange 45 of the secondary unit, same being interposed between plates 24 and 26. The surfaces of spherical flange 45 are parts of a ball sphere. Thus a relative universal hinge movement is possible between the two units. For certain purposes a single plane hinge movement is desired and for this purpose spherical flange 45 is provided with an extension 60 which reaches through an aperture 61 in bearing plate 24 into the inside of axle housing 18. Axle housing 18 is provided with a hollow protrusion 62 in which part is inserted a screwplug 63, integral with a hinge pin 64 mating with bushing 65 firmly held by extension 60. Desirably the continuation of the center line of hinge pin 64, the transverse center line of axle gear 31 and the center line of rear axle shaft 49 should meet at the point which is the center of the ball sphere of spherical flange 45. This point of meeting 75 in Figure 3 is illustrated to coincide in the center line continuation of the pinion shaft 16 or axle pinion 32 respectively or longitudinal center line of the chassis as Figure 1 indicates it.

The primary unit is fulcrumed to the frame side members 10 through spherical ball 66 held in socket 28 in hub 26' by cap 29. Ball 66 is free to move universally in its seat and is provided with a cylindrical bore 67, permitting the ball 66 to slide on axle fulcrum pin 68, which pin through shank 69 and crossmember 70 is firmly connected to side-members 10. Inasmuch as axle fulcrum pin 68 engages the primary unit at a point farther from wheel 21 than is the chassis center line the wheel 21 of the primary unit at spring flexure will describe a curve with this large radius and is referred to in this application as "long hinged". The secondary unit center will rise or drop in harmony with the primary unit as the primary unit fulcrum is in the approximate horizontal plane with the center of the secondary unit when the springs are at mid-travel. With this arrangement of fulcrums, when the chassis is springing generally parallel to the ground, then the secondary unit wheel will describe a curve also from a long hinged radius, in view of its rising and dropping center, and in effect both units are long hinged.

Figure 2 illustrates that each frame side member 10 is provided with an elliptical opening 10' at the rear axle and the axle tubes protrude through such openings. This construction is not new per se but in connection with a hinged axle it has the advantage that it does not need to be as large an opening with a given wheel travel as in the case of a solid axle. This is of great importance for the rear axle, which requires greater travel than the front axle. The opening 10' also serves as axle travel limitor with ample space around it for anchoring generous size rubber bumpers 71 to limit the axle travel (also illustrated in Figure 11).

Figures 4 and 5 illustrate the connection between the units and their respective springs. Axle tube 47 is provided with preferably pre-machined part-spherical lugs 72 with depressions 72' preferably electrically jig-welded to the axle tube. Surrounding these lugs is the spring pad 73 and cap 74 provided with depressions at their mating surfaces, complementary to depressions 72' to receive oscillating fulcrum balls 75 to serve as oscillating hinges. These oscillating hinges practically eliminate the twisting of springs 11 but transmit the torque and by this construction the pad and cap can be filled with lubricant for long duration. To prevent the loss of lubricant collapsible elastic sealing rings 76 are inserted at each end.

Figures 1, 2, 3 and 4 illustrate that with this "long hinged" independent wheel suspension this axle construction could replace a "solid" rear axle, presently in general production programs, and only requires the addition of a fulcrum point on the frame. Solid axles are too well known to require description. The semi-elliptical springs illustrated, which are customary with Hotchkiss drives, are directly hinged at their fore ends to the frame side members. The flexure of these springs, because of their direct hinging, will shorten or lengthen the wheel base of the automobile. With that aim the axle fulcrum 66 is slidable fore and aft. With Hotchkiss drive it is also possible for one wheel to advance relative to the other, which places the axle out of perpendicular with the automobile's longitudinal center line, causing wheel misalignment, the universal axle fulcrum permitting one wheel to toe in and the other to toe out slightly. The springs, when taking the torque and torque variations, can have a similar effect, to which this axle construction illustrated can accommodate itself.

With the propeller shaft turning anti-clockwise, as is customary, looking from the rear of the car, by making the right wheel unit the primary unit and suspending it beyond the longitudinal centerline the tooth pressures between the rear axle pinion and the gear will be more uniform when the wheel base changes from spring flexure, especially with springs so constructed that they are longest when fully compressed. As the downward hinging of the primary unit and associated arching of the semi-elliptical spring shorten the wheelbase, the shortening of the wheelbase, in the absence of tire slippage, will, in effect, roll the wheel forward on the ground. In view that the axle gear is meshed with the axle pinion on the far side of the pinion from the driving wheel, the downward hinging of the unit will result in a partial rotation of the driving wheel, corresponding in direction to the above, namely: rolling the wheel forward on the ground.

Figure 6 is a modification of Figure 1, as far as the axle fulcrum is concerned. The fulcrum, instead of sliding, is mounted on a frame side member 10 through ball sphere 77, spring blade 78 and bracket 79, the spring blade 78 having a forward tension and sufficient width and strength to support the axle center and the sideways pressures of the car. This construction eliminates the necessity of any attention to protect a sliding joint.

Figures 7, 8, and 9 illustrate the rear elevation of the axle center housing of Figures 1, 2 and 3 but with a modified fulcrum. The fulcrum sphere instead of being to the fore of the rear axle is placed in substantially the same vertical plane with the rear axle center-line, thus increasing the torque response of a given spring with a given power transfer. As illustrated in Figure 7, cover plate 26 is provided with a hub 85 having a part sphere 86 and mating with cap 87 encompasses a ring-shaped part ball 88 which, with neck 89, is connected to the frame. Where neck 89 protrudes from hub 85 and cap 87 an elastic material ring 90 seals the opening. In Figure 8 by cap 91 and pin 92 the housing is linked to the frame crossmember 93 and through it to frame side-members 10 (not shown). In Figure 9 the neck 89 through universal ball 94 and cap 95 is linked to crossmember 93. The construction in Figure 9 permits movement of the frame transverse relative to the rear axle, similar to the Hotchkiss drives in production. For certain applications the side bending of the semi-elliptical springs and their resultant elasticity between the frame and axle are desirable.

Figures 10 and 11 illustrate a modification of the center housing of Figure 1 with the prime difference that besides the housing sliding fulcrum, illustrated in Figures 1 and 3, the primary unit, through cover plate 26 and cover plate hub 26', is connected by a universal joint link 100 and connecting spheres 101 and 102, held in place by caps 103 and 104 to the stationary shank 69.

The downward hinging of the primary unit and the ensuing arching of the spring will roll the primary wheel forward and cause a toeing in. As it is the fore part of the half elliptic spring that is directly connected to the frame the primary unit will be rocked in relation to the spring front fulcrum, causing a tensional strain on link 100, and the resultant forward sliding of the axle fulcrum diminishes or eliminates the toeing in. For a springing of the chassis, generally parallel to the ground, the wheel misalignment caused by the toeing in of both primary and secondary units will be diminished. Only the primary unit controlling the fulcrum's forward or backward movement necessitates the elimination of the hinge at the rear of the housing, so Figure 10 does not show the protrusion 63 nor do Figures 10 and 11 show the screwplug 63; otherwise Figure 3 is the enlarged horizontal section.

The constructions illustrated in Figures 10 and 11 are not limited to the sliding fulcrum nor limited to the driving spring swinging around its front fulcrum as it would perform equally well with the radius rod of Figure 17, to be described later.

The preceding description indicates that the long hinging of both the primary and the secondary units is possible with but a single fulcrum and with a single universal joint and the wheel misalignment caused by the toeing in can be controlled in a Hotchkiss drive. The advantages of the constructions described are not limited to the Hotchkiss drive, as shown in Figure 12.

Figure 12 illustrates an independently suspended torque tube drive where frame 109 is supported by cantilever springs 110. The primary unit's principal parts are: Axle housing 18 secured to it, axle tube 20 carrying the driving wheel 21. Axle housing 18 has secured to its forward end torque tube 111, terminating in a spherical shell 113 and surrounding the propeller shaft 112. Torque tube 111 is provided with a bracket 114, forming the front terminal anchor of radius rod 115, bracing same to axle tube 20. Axle housing 18 also covers coverplate 26, which is provided with an arm 116, integral with fulcrum pin 117. The primary unit is fulcrumed at two places; with fulcrum pin 117 in socket 118, an extension of shank 119, which is secured to cross member 70, and at the fore end of the torque tube by the spherical shell 113 to the power-plant (not shown).

The secondary unit's principal parts are: Axle tubing 47 carrying driving wheel 48; firmly secured to axle tube 47 is radius rod 120, terminating in ball 121, operating in socket 122, which is in bracket 123, connected to torque tube 111 in a suitable manner.

For the benefit of long hinging the primary unit's wheel will describe a curve around the center line connecting the center line of fulcrum pin 117 to the center point of the spherical shell 113. The hinge line is at a small angle to the chassis' longitudinal center line. To overcome the inequalities of tread variation the secondary unit is mounted at a similar angle, this from the center line of ball 121 to the center hinge point in axle housing 18 or the center point of the ball sphere of the secondary unit, as illustrated in Figure 3.

A long hinged torque tube drive axle construction has many advantages; principal among them are that the frame carries the heavy axle housing and torque tube weight directly; the torque and brake reactions are taken by the torque tube, this including the drive; and with long hinging the reduced tread variation of the chassis' rear end becomes steady.

The long hinging applied to the torque tube and spring drive, which is a composition of the Hotchkiss and the torque tube drive, is illustrated in Figure 13. This drive has been made popular by one of the two largest automobile manufacturers of the globe. Here frame 10 is supported by springs 11 with a direct front connection 12 to the frame side member 10.

The primary unit's principal parts are: Axle housing 18, connected to it axle tube 20, carrying driving wheel 21; on the other side of axle housing 18 is cover plate 26, provided with arm 116 and integral with it fulcrum pin 117. The forward part of axle housing 18 is provided with a torque tube 129, terminating in neck 130, sliding in sleeve 131, integral with spherical shell 132. The primary unit is fulcrumed on a line connecting the center point of spherical shell 132 and center line of fulcrum pin 117. Spherical shell 132 is operatively connected to the rear end of a power plant (not shown), being the front fulcrum of the primary unit. The rear fulcrum consists of fulcrum pin 117, operating in fulcrum socket 118, on extension of shank 119, mounted on cross member 70.

The secondary unit's principal parts are: Axle tube 47, carrying driving wheel 48, hinged to axle housing 18 and connected to spring 11 by spring pad 73 and cap 74, and oscillating fulcrum balls 75, as indicated in Figures 4 and 5.

The primary and secondary units are hinged at a single point, like in Figures 10, 11 and 12 so the protrusion 62 and screwplug 63 are omitted from the rear end of axle housing 18. The primary unit's axle tubing 20 is connected to spring 11 by spring pad 73 and cap 74 but as the torque tube takes the torque the oscillating fulcrum balls 75 are omitted (not shown), and part spherical lugs 72 seated between spring pad 73 and cap 74, with the desired clearance, will be the drive transmitting connection and the means to protect the spring from twisting.

At spring flexure the primary unit, carrying with it the secondary unit's center fulcrum, will advance or retard relative to the frame, as controlled by the forward part of the semi-elliptic spring and this unit will slide at the forward end by neck 130 sliding in sleeve 131, and at the rear end fulcrum pin 117 sliding in a spaced socket 118. In a springing of the chassis, when generally parallel to the ground, the toeing in and toeing out are practically eliminated. The secondary unit's brake reaction is taken by spring 11 by inserting a ball in the upper or lower part of spherical flange 45 and protruding therefrom and a generally vertical groove in either bearing plate 24 or cover plate 26 (not shown), the brake reaction can be transferred to axle housing 18 and the torque tube.

The primary unit rear connection to the frame illustrated in Figs. 1, 12 and 13 might be replaced by a link illustrated in either Figs. 7, 8 or 9 (not shown). It is imperative that the link should permit a limited universal movement of the primary unit in relation to the frame.

The construction described in reference to Figures 1 to 13 inclusive, excepting Figures 4 and 5, describes long hinged action of both units when the chassis springs generally parallel to the ground. When it is desired that each unit should long hinge all the time and at the same time reduce tread variation, such construction is illustrated in Figures 14, 15 and 16 where frame side members 133 are supported by springs 11, with their front ends fulcrumed directly to the frame as in Figures 1, 2 and 13. Axle housing 134 through hub 135 is firmly connected to axle tubing 20, carrying driving wheel 21. Axle housing 134 is integral with pinion shaft housing 136, in which pinion shaft 16 is mounted. End plate 137 is mounted on axle housing 134 on the side opposite axle tubing 20. This end plate carries arm 138, said arm being firmly mounted thereon and terminating in fulcrum ball 139. Parts 134 to 139 inclusive are the principal parts of the primary unit.

The secondary unit's principal parts are: Axle tubing 140 carrying driving wheel 48 on its outside and on its inside end a housing 141 encasing a universal joint, and firmly connected to the axle tubing, by such method as welding, is axle arm 142, terminating in fulcrum ball 143. Each axle unit is independently fulcrumed to the frame and for long hinging is fulcrumed at a point on the far side of the chassis' longitudinal center line from its associated wheel. The primary unit fulcrum ball 139 in bracket 144 is held in place by cap 145. The secondary unit's fulcrum ball 143 in bracket 146 is held in place by cap 147. Both brackets depend from cross member 70 which connects frame side members 133, as illustrated in Figure 15.

Figure 15 also illustrates that both fulcrum balls 139 and 143 are positioned below the horizontal plane traversing the axle housing center when desired and this lowering of the fulcrum point also serves as means to reduce tread variation, though it correspondingly increases the variation of the distance between the upper part of the two associated wheels. The inward movement of the upper part of the wheel requires a deeper wheel housing, thereby diminishing the width of the rear seat of an automobile, therefore, the expression, "long hinged", as defined in the fourth paragraph of this application, shall mean there is less tread variation than with "center hinged" construction either by means of increased length of radius or by lowering the axle fulcrum point below a horizontal plane traversing the axle housing center or the combination of both.

The driving power for the driving wheels 21 and 48 in reference to Figures 14 and 16 is received from the power plant through propeller shaft 14, universal joint in housing 15, pinion shaft 16 by axle gear 152, illustrated in Figure 16. Axle gear 152 is mounted on differential housing 153, containing the customary differential, distributing the power to axle shaft 37 of the primary unit and stub shaft 154, carrying a universal joint 155 (to be described later) in housing 156, these also of the primary unit, through axle propeller shaft 157 to the universal joint in housing 141 of the secondary unit.

In this construction, being a Hotchkiss drive, the axle tube connection to the springs is similar to the ones described in Figures 4 and 5, and as in Hotchkiss drives the spring deflection advances or retards the associated wheel and in view that the fulcrums are stationary will cause the wheels to toe in or to toe out. The lengthening, however, of the distance between the wheel and associated fulcrum will proportionately reduce the wheel misalignment caused by the toeing in or out and serves for the same purpose as the advance or retard of the fulcrum described in connection with Figures 1 to 11 inclusive, excepting Figures 4 and 5. As the illustration and description reveal, this construction permits complete long hinging with only two universal joints between the two driving wheels.

A method of obtaining further reduction of the toeing in or out with Hotchkiss drive is illustrated in Figure 17, where a radius rod 158, at its rear end terminates in ball 158' and this ball is universally positioned in extensions of spring pad 73 and cap 74. The front end of the radius rod terminates in hub 159, containing a usual rubber bushing (not shown) and is fulcrumed in spring bracket 160 carried by frame side member 133. Rod 158 spaces the outer end of the half axle at a practically fixed distance from the spring front fulcrum bracket 160. As radius rod 158 is the axle spacer, at the front end of spring 11 a spring shackle 13 is interposed.

A method of obtaining control of the toeing in and out is illustrated in Figure 18 where a radius rod 162 rearwardly terminates in a flat portion 163, firmly secured to axle tube flange 20'. This radius rod at its front terminates in a fulcrum ball 164 mounted in socket 165 and when a semi-elliptical spring is used like in Figure 17, at the front end of the spring a spring shackle is interposed. To reduce tire wear the ball 164 is normally positioned at a higher level than the center of axle tube 20 (not shown). In this construction a light and inexpensive radius rod takes the torque, drive and brake reaction. The elimination of a torque tube permits the use of an accessible propeller shaft and permits both units to be long hinged, center hinged or short hinged.

The constructions heretofore described can be incorporated in an automobile having a solid axle construction, that is, a construction wherein the wheels are not independently sprung. It is essential only that a new axle system be substituted and only one fulcrum place or hinge point need be added to the frame assembly for the constructions shown in Figures 1 to 13 inclusive; in reference to Figures 14, 15 and 16 two are required; for Figures 17 and 18, depending upon the style of application, either one or two are necessary. The fore and aft locations of these fulcrum points on the frame are of great importance, particularly in the constructions shown in Figures 1 to 3 inclusive, 6 to 11 inclusive, and 14 and 15, that is, the ones using a Hotchkiss drive, and in Figure 17. This location influences the wheel misalignment caused by toeing in and toeing out for a given spring deflection. In Figures 7, 8 and 9, the fulcrum center and the axle center-line practically coincide. With this fulcrum location the wheel misalignment is practically at a minimum. When it is desired to reduce the torque response and the maximum angle of tilting of the axle when responding to a given torque, this is illustrated in Figures 1 and 3 where the fulcrum is close to the vertical plane traversing the chassis' longitudinal center-line and the center of gravity of the axle unit for balanced tilting. The torque response decreases until the fulcrum is in line with the rear axle gears, so it is desirable to place the fulcrum rearward of the pinion and gear meshing point. This reduced torque response makes this Hotchkiss drive more valuable as this reduction will prevent the axle from falling into synchronic bouncing when pulling hard in sand, thus these constructions might be termed "limited" Hotchkiss drives.

Figure 19 illustrates a modification of the invention. Here an axle housing 189 contains the axle gearing and differential, a modification of the one described in connection with Fig. 3. Here differential gear 36' is integral with hub 38' upon which it runs. Concentrically mounted thereto and driven by key 203 is neck 204 of a universal joint 155. Neck 204 is part of hub 205, provided with pins 206 in perpendicular alignment thereto; on these pins are mounted universal blocks 207. Parts 203 to 207, inclusive, constitute the principal parts of the driving half of the crosshead double universal joint.

Hub 205 is provided with a spherical depression 208 in which is seated the spherical, hollow protrusion 209, integral with hub 205' of the driven half of the universal joint mechanism. This hub is provided with pins 206' and mounted thereon are universal blocks 207. To prevent separation of the driving and driven halves protrusion 209 contains a spherical opening concentric with the hollow protrusion in which spherical bolthead 210 is seated, and is part of and connects with bolt 211 passing through the hollow protrusion and hub 205 and is held in position by nut 212. The driving and driven halves are coupled with an encompassing shell 155, the inside of which is provided with means to drivingly engage universal blocks 207. The driven half is provided with splines in its hub 205', into which drivingly and slidingly fit the splined end of axle shaft 213 to compensate for the variation of the distance of the driving wheels, when so desired.

Whereas these illustrations show bevel gear and pinion axle gears these constructions are not limited to them as they are applicable to hypoid gear and pinion or worm and worm wheel axle gearing. In this patent application the expression "main frame" is meant to describe the mechanical structure connecting the front and rear axles and arranged to support the useful space of the body of the automobile without regard, however, as to its shape, size or location.

I claim as my invention:—

1. An independent drive-wheel suspension for an automobile having a main-frame, comprising a primary unit and a secondary unit; said primary unit including a rigid member extending transversely of the main frame and across the longitudinal center-line thereof, said rigid member being oscillatably supported from said frame at its inner end and having a wheel rotatably mounted on its outer end, two co-axial rotatable elements mounted on said rigid member, and differential mechanism acting between said rotatable elements, one of said elements being connected to said wheel to drive it and the other of said elements having a universal joint associated with it and located at a point spaced along said rigid member toward its associated wheel from its point of support from the frame and substantially at the transverse center of the frame; said secondary unit comprising a second rigid member pivotally connected to the rigid member of the primary unit on an axis substantially coincident with the center of said universal joint, said second member extending transversely of said frame and having a wheel rotatably mounted on its outer end, and an axle shaft drivingly interconnecting said wheel and said universal joint; and spring means acting between said frame and each of said primary and secondary units.

2. An independent wheel suspension for an automobile having a main frame, comprising primary and secondary rigid members extending transversely of said frame and each having a wheel rotatably mounted on its outer end, said primary rigid member extending inwardly of the frame, across the longitudinal center-line thereof, and being oscillatably supported from said frame at a point on the opposite side of such center-line from its associated wheel, said secondary rigid member extending inwardly of said frame and being pivotally connected to the primary member at a point spaced therealong toward the wheelend thereof from its point of support from the frame and substantially at the transverse center of the frame, and spring means acting between said frame and each of said rigid members.

3. An independent drive-wheel suspension for an automobile having a main frame, comprising two axle-sections extending generally transversely of said frame and being provided respectively with wheels on their outer ends, said axle-sections being mounted for independent and generally vertical swinging movement relative to said frame, at least one of said axle-sections being connected at its inner end to said main-frame through a universal connection located on the opposite side of the longitudinal center-line of said frame from the associated wheel, leaf springs extending generally longitudinally of said frame at the sides thereof and connected respectively to said axle-sections to transmit driving torque and thrust to said frame, and means for driving said wheels.

4. An independent drive-wheel suspension for an automobile having a main frame, comprising two axle-sections extending generally transversely of said frame and being provided respectively with wheels on their outer ends, said axle-sections being mounted for independent and generally vertical swinging movement relative to said frame and being connected to said frame through universal pivot means, a ring gear rotatably supported from one of said axle-sections, means including differential mechanism operatively connecting said ring gear with said wheels, the distance between the center of said universal pivot means and the axis of said ring gear being less than the radius of said ring gear, a drive pinion meshing with said gear, and leaf springs extending generally longitudinally of said frame at the sides thereof and connected respectively to said axle-sections to transmit driving torque and thrust to said frame.

5. An independent drive-wheel suspension for an automobile having a main frame, comprising two axle-sections extending generally transversely of said frame and being provided respectively with wheels on their outer ends, said axle-sections being pivotally interconnected, one of said axle-sections extending inwardly beyond its point of pivotal connection to the other, a member universally pivoted to the inwardly extending portion of such axle-section, means guiding said member for general horizontal movement longitudinally of said frame, leaf springs extending generally longitudinally of said frame at the sides thereof and connected respectively to said axle-sections to transmit driving torque and thrust to said frame, and means for driving said wheels.

6. An independent drive-wheel suspension for an automobile having a main frame, comprising two axle-sections extending generally transversely of said frame and being provided respectively with wheels on their outer ends, said axle-sections crossing each other and extending inwardly beyond the longitudinal center-line of said frame, a universal pivot means connecting the inner end of each axle section to said frame, a pair of rotatable members mounted on one of said axle-sections, means including a differential for driving said two rotatable members, a shaft connecting one of said rotatable members with the wheel on the axle-section on which said two rotatable members are mounted, a second shaft, two universal joints connecting said second shaft with the other rotatable member and the other wheel respectively, and leaf springs extending generally longitudinally of said frame at the sides thereof and connected respectively to said axle-sections to transmit driving torque and thrust to said frame.

7. An independent rear drive-wheel suspension for an automobile having a main frame, comprising two pivotally interconnected axle-sections extending transversely of said frame and being provided on their outer ends with wheels, pivot means connecting one of said axle-sections to said frame at a point on the opposite side of the longitudinal centerline of said frame from the associated wheel, said last named axle-section having rigid with it a forwardly extending torque and drive transmitting member of fixed effective length, the front end of said member being universally pivoted to said frame at a point substantially on the axis of said pivot means, spring means acting between said frame and each of said axle-sections, and means for driving said wheels.

8. An independent rear drive-wheel suspension for an automobile having a main frame, comprising two pivotally inter-connected axle-sections extending transversely of said frame and being provided on their outer ends with wheels, pivot means connecting one of said axle-sections to said frame at a point on the opposite side of the longitudinal center-line of said frame from the associated wheel, said last named axle-section having rigid with it a forwardly extending torque transmitting member, the front end of said member being universally pivoted to said frame at a point substantially on the axis of said pivot means, spring means acting between said frame and each of said axle-sections, and means for driving said wheels.

9. An independent rear drive-wheel suspension for an automobile having a main frame, comprising two pivotally interconnected axle-sections extending transversely of said frame and being provided on their outer ends with wheels, pivot means connecting one of said axle-sections near its inner end to said frame, said last named axle-section having rigid with it a forwardly extending torque-transmitting member of variable effective length, the front end of said member being universally pivoted to said frame at a point substantially on the axis of said pivot means, spring means acting between said frame and each of said axle-sections, and means for driving said wheels.

10. An independent rear drive-wheel suspension for an automobile having a main frame, comprising two pivotally inter-connected axle-sections extending transversely of said frame and being provided on their outer ends with wheels, said two axle-sections being mounted for independent swinging movement in a generally vertical plane, one of said axle sections being integral with a differential housing and universally pivoted to said frame, a ring gear in said differential housing, a pinion gear for driving said ring gear, universally jointed driving means for said pinion gear, means operatively connecting said wheels with said ring gear, a torque-transmitting radius rod of fixed effective length rigidly attached to each of said axle-sections and extending forwardly therefrom, each of said radius rods being connected at its front end to said frame through pivot means, and spring means acting between said frame and each of said axle-sections.

11. An independent rear drive-wheel suspension for an automobile having a main frame, comprising two inter-connected axle-sections extending transversely of said frame and being provided on their outer ends with wheels, said two axle-sections being mounted for independent swinging movement in a generally vertical plane, each of said two axle-sections being pivoted to said frame at a point on the opposite side of the longitudinal center line of said frame from its associated wheel, a radius rod of fixed effective length attached to each of said axle-sections and extending forwardly therefrom, each of said radius rods being connected at its front end to said frame through pivot means, spring means acting between said frame and each of said axle-sections, and means for driving said wheels.

12. An independent rear drive-wheel suspension for an automobile having a main frame, comprising two pivotally inter-connected axle-sections extending transversely of said frame and being provided on their outer ends with wheels, said two axle-sections being mounted for independent swinging movement in a generally vertical plane, one of said axle sections being integral with a differential housing and universally pivoted to said frame, a ring gear in said differential housing, a pinion gear for driving said ring gear, universally jointed driving means for said pinion gear, means operatively connecting said wheels with said ring gear, a radius rod of fixed effective length universally pivotally attached to each of said axle-sections and extending forwardly therefrom, each of said radius rods being connected at its front end to said frame through pivot means, and torque transmitting spring means acting between said frame and each of said axle-sections.

13. An independent drive-wheel suspension for an automobile having a main frame, comprising two axle-sections extending generally transversely of said main frame and having wheels rotatably mounted in their respective outer ends, each of said axle-sections extending inwardly across the longitudinal center-line of said frame and being pivotally connected to said frame on the opposite side of said center-line from its associated wheel, differential mechanism, means for driving said differential mechanism, power-transmitting mechanisms operatively connecting said differential mechanism respectively with said wheels, at least one of said power-transmission mechanisms including an intermediate shaft and universal joints connecting said shaft respectively with its associated wheel and said differential mechanism, and spring means acting between said frame and each of said axle-sections.

14. An independent wheel suspension for an automobile having a main frame, comprising a primary rigid member extending transversely of the frame and having a wheel rotatably mounted on its outer end, a universal joint intermediate the ends of said primary member and located at substantially the transverse center of the frame, said primary member being pivotally supported from said frame at a point spaced from said universal joint in a direction away from said wheel and substantially on a level with said universal joint whereby vertical movement of the wheel will move said universal joint substantially vertically, a secondary rigid member secured to said primary member by said universal joint and extending transversely of said frame, said secondary member having a wheel rotatably mounted on its outer end, and spring means acting between said frame and each of said rigid members.

15. An independent wheel suspension for an automobile having a main frame including opposite side members, comprising a primary rigid member extending transversely of the frame and having a wheel rotatably mounted on its outer end, the side frame member nearest said wheel having an opening, top and bottom bumpers carried by said frame and projecting into said opening, said primary member extending through said opening between said bumpers, a universal joint intermediate the ends of said primary member, said primary member being pivotally supported from said frame at a point spaced from said universal joint in a direction away from said wheel and substantially on a level with said universal joint whereby vertical movement of the wheel will move said universal joint substantially vertically, a secondary rigid member secured to said primary member by said universal joint and extending transversely of said frame, said secondary member having a wheel rotatably mounted on its outer end, the frame side member nearest said last named wheel also having an opening therein and top and bottom bumpers extending into said opening, said secondary member extending through said opening between said bumpers, and spring means acting between said frame and each of said rigid members.

16. An independent rear drive-wheel suspension for an automobile having a main frame, comprising two pivotally interconnected axle-sections extending transversely of said frame and being provided on their outer ends with wheels, pivot means connecting one of said axle-sections near its inner end to said frame and permitting longitudinal movement between said axle-section and frame, said last named axle-section having rigid with it a forwardly extending torque-transmitting member provided with a telescopic joint intermediate its length, the front end of said member being universally pivoted to said frame at a point substantially on the axis of said pivot means, spring means acting between said frame and each of said axle-sections, and means for driving said wheels.

17. An independent rear drive-wheel suspension for an automobile having a main frame, comprising two pivotally interconnected axle-sections extending transversely of said frame and being provided on their outer ends with wheels, pivot means connecting one of said axle-sections near its inner end to said frame and permitting longitudinal movement of said axle-section with respect to said frame, said pivot being located at a point spaced from the longitudinal center line of said frame in a direction away from the wheel associated with said pivoted axle-section, said last named axle-section having rigid with it a forwardly extending torque-transmitting member of variable effective length, the front end of said member being universally pivoted to said frame at a point substantially on the axis of said pivot means, spring means acting between said frame and each of said axle-sections, and means for driving said wheels.

18. An independent wheel suspension for an automobile having a main frame, comprising primary and secondary axle-sections extending transversely of said frame, each of said axle-sections including a housing and a shaft within such housing, the primary axle-section having a differential housing at its inner end, a spherical joint between the housing of said secondary section and said differential housing, a concentric universal joint interconnecting said two axle shafts, a ring gear operatively interconnected to drive said two axle shafts, a pinion gear for said ring gear supported by said differential housing on an axis passing through the centers of said spherical joint and universal joint, an extension integral with the housing of said secondary axle-section having its end pivotally secured to said differential housing on an axis passing through said centers, a pivotal joint on said primary axle-section on the side thereof toward said secondary axle housing and connecting it to said frame, and spring means acting between said frame and each of said axle sections.

19. An independent wheel suspension for an automobile having a main frame, comprising primary and secondary axle-sections extending transversely of said frame, each of said axle-sections including a housing and a shaft within such housing, the primary axle-section having a differential housing at its inner end, a spherical joint between the housing of said secondary section and said differential housing, a concentric universal joint interconnecting said two axle shafts, a ring gear operatively interconnected to drive said two axle shafts, a pinion gear for said ring gear supported by said differential housing on an axis passing through the centers of said spherical joint and universal joint, an extension integral with the housing of said secondary axle-section having its end pivotally secured to said differential housing on an axis passing through said centers, and spring means acting between said frame and each of said axle sections.

20. An independent drive wheel suspension for an automobile having a main frame, comprising primary and secondary axle housings, a differential housing adjacent the inner end of said primary axle housing, a spherical surface on the opposite side of said differential housing from its associated axle housing, a cap overlying said spherical surface, a spherical flange rigid with said secondary axle housing and received between said spherical surface and said cap, an extension on said spherical flange pivotally supported within said differential housing on an axis substantially perpendicular to said axle housing and passing through the center of said spherical surface, and spring means acting between said frame and each of said axle sections.

21. An independent wheel suspension for an automobile having a main frame, comprising an axle section extending transversely of said frame and provided with a wheel at its outer end, a support located on the opposite side of the longitudinal center line of said frame from said wheel for supporting the inner end of said axle section, adapted to transmit to said frame forces acting laterally thereof, and permitting rotation of said axle section, a member rigid with said axle-section and pivotally supported by said frame at a point spaced longitudinally thereof from said axle, said member being adapted to fix the position of said axle section angularly with respect to said center line and to transmit torque reactions to said frame, and springing means for said axle section.

22. An independent rear drive-wheel suspension for an automobile having a main frame, comprising two pivotally interconnected axle sections extending transversely of said frame and provided on their outer ends with wheels, means for supporting one of said axle sections near its inner end on said frame, said last named axle section having rigid with it a forwardly extending torque-transmitting member, an articular joint at the front end of said member by which such front end is supported from said frame, said supports for said one of said axle sections and for said front end of said torque member being substantially alined whereby said axle section may move relative to said frame in a generally vertical direction, spring means acting between said frame and each of said sections, and means for driving said wheels.

23. An independent wheel suspension for an automobile having a main frame, comprising primary and secondary axle-sections extending transversely of said frame, each of said axle-sections including a housing and a shaft within such housing, the primary axle-section having a housing containing a differential at its inner end, a spherical joint between the housing of said secondary section and said differential housing, a concentric universal joint concentric with said spherical joint and interconnecting said two axle shafts, a ring gear operatively interconnected to drive said two axle shafts, a pinion gear for said ring gear supported by said differential housing, an extension integral with the housing of said secondary axle-section having its end oscillatably secured to said differential housing on an axis passing through the centers of said spherical joint and universal joint, and spring means acting between said frame and each of said axle sections.

24. An independent drive-wheel suspension for an automobile having a main frame, comprising two axle-sections carrying driving wheels, one axle-section being fulcrumed on a fixed pivot adjacent its inner end directly on said frame at a point transversely offset with respect to the longitudinal axis of the automobile, and the second axle-section fulcrumed solely on said first-mentioned axle-section, these fulcrums permitting a substantially vertical oscillation of said axle-sections in relation to said frame, and spring means acting between said frame and each of said axle-sections.

25. An independent drive-wheel suspension for an automobile having a main frame, comprising two axle-sections extending generally transversely of said frame and being provided respectively with wheels on their outer ends, said axle-sections being mounted for independent and generally vertical swinging movement relative to said frame and being connected to said frame through universal connecting means, a ring gear rotatably supported from one of said axle-sections, means including differential mechanism operatively connecting said gear with said wheels, the distance between the center of said universal connecting means and the axis of said gear being less than the radius of said gear, a drive element meshing with said gear, and leaf springs extending generally longitudinally of said frame at the sides thereof and connected respectively to said axle-sections to transmit driving torque and thrust to said frame.

26. An independent rear drive-wheel suspension for an automobile having a main frame, comprising two pivotally interconnected axle-sections extending transversely of said frame and being provided on their outer ends with wheels, means rotatably connecting one of said axle-sections to said frame at a point on the opposite side of the longitudinal center-line of said frame from the associated wheel, said last-named axle-section having rigid with it a forwardly extending torque and drive transmitting member of fixed effective length, the front end of said member being universally pivoted to said frame at a point substantially on the axis of said rotatable connection to permit substantially vertical oscillation of said axle-section in relation to said frame, spring means acting between said frame and each of said axle-sections, and means for driving said wheels.

27. An independent rear drive-wheel suspension for an automobile having a main frame, comprising two relatively rotatable interconnected axle-sections extending transversely of said frame and being provided on their outer ends with wheels, means rotatably connecting one of said axle-sections near its inner end to said frame, said last-named axle-section having rigid with it a forwardly extending torque-transmitting member of variable effective length, the front end of said member being pivoted to said frame at a point substantially on the axis of said rotatable connection to permit substantially vertical oscillation of said axle-section in relation to said frame, spring means acting between said frame and each of said axle-sections, and means for driving said wheels.

JULES HALTENBERGER.